(12) United States Patent
Boul (10) Patent No.: US 11,710,895 B2
(45) Date of Patent: Jul. 25, 2023

(54) STIMULUS-RESPONSIVE DYNAMIC LIQUID CRYSTAL ELASTOMERS

(71) Applicant: Saudi Arabian Oil Company, Dhahran (SA)

(72) Inventor: Peter Boul, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/411,626

(22) Filed: Aug. 25, 2021

(65) Prior Publication Data

US 2022/0077573 A1 Mar. 10, 2022

Related U.S. Application Data

(60) Provisional application No. 63/076,055, filed on Sep. 9, 2020.

(51) Int. Cl.
| | |
|---|---|
| *G02F 1/1333* | (2006.01) |
| *H01Q 1/36* | (2006.01) |
| *C09K 19/32* | (2006.01) |
| *C09K 19/34* | (2006.01) |
| *E21B 49/00* | (2006.01) |

(52) U.S. Cl.
CPC .............. *H01Q 1/364* (2013.01); *C09K 19/32* (2013.01); *C09K 19/3402* (2013.01); *C09K 2019/3425* (2013.01); *E21B 49/00* (2013.01)

(58) Field of Classification Search
CPC ................ C09K 19/32; C09K 19/3402; C09K 2019/3425; C09K 2019/0448; C09K 2019/0444; C09K 2019/3804
See application file for complete search history.

(56) References Cited

U.S. PATENT DOCUMENTS

| | | | |
|---|---|---|---|
| 6,844,852 B1 | 1/2005 | Simons | |
| 8,587,493 B2 | 11/2013 | Dickey et al. | |
| 9,260,570 B2 * | 2/2016 | Verduzco | B29C 71/0072 |
| 2019/0062487 A1 * | 2/2019 | Iseki | C08G 18/3215 |
| 2019/0077071 A1 | 3/2019 | Ware et al. | |
| 2022/0077573 A1 * | 3/2022 | Boul | H01Q 1/364 |

OTHER PUBLICATIONS

Chambers et al., "Liquid crystal elastomer-nanoparticle systems for actuation." Journal of Materials Chemistry 19.11, 2009, 1524-1531, 7 pages.
Gelebart et al., "Photoresponsive fiber array: toward mimicking the collective motion of cilia for transport applications." Advanced Functional Materials 26.29, Aug. 2016, 5322-5327, 6 pages.
Mather et al., "Michael addition reactions in macromolecular design for emerging technologies." Progress in Polymer Science 31.5, May 2006, 487-531, 45 pages.
Saed et al., "Molecularly-engineered, 4D-Printed liquid crystal elastomer actuators." Advanced Functional Materials 29.3, 2019, 9 pages.
PCT International Search Report and Written Opinion in International Appln. No. PCT/US2021/049675, dated Feb. 9, 2022, 15 pages.
Davidson et al., "3D Printable and Reconfigurable Liquid Crystal Elastomers with Light-Induced Shape Memory via Dynamic Bond Exchange," Advanced Materials, Jan. 2020, 6 pages.
Ohm et al., "Liquid Crystalline Elastomers as Actuators and Sensors," Advanced Materials, 22: 3366-3387, Aug. 2010, 22 pages.

* cited by examiner

*Primary Examiner* — Geraldina Visconti
(74) *Attorney, Agent, or Firm* — Fish & Richardson P.C.

(57) ABSTRACT

Compositions, systems and methods for use in monitoring an environment or a formation. The compositions can include electrically conductive material that can be used as a sensor. The sensor can have a non-writeable, writeable, and stimulated state. A first signal is used to induce the non-writeable material into a writeable state. In the writeable state, the electrically conductive material has the capacity for actuation in response to an orthogonal signal. In response to the orthogonal signal, the electrically conductive material then undergoes a conformation or shape change. The conformational or shape change induces a strain or actuation that can be used to generate a signal. The stimulated state can be reversible, and in the absence of the orthogonal signal the electrically conductive material may resume its original shape or conformation.

19 Claims, 4 Drawing Sheets

STIMULUS-RESPONSIVE DYNAMIC LIQUID CRYSTAL ELASTOMERS

CLAIM OF PRIORITY

This application claims priority to U.S. Provisional Application Ser. No. 63/076,055, filed on Sep. 9, 2020, the entire contents of which is hereby incorporated by reference.

TECHNICAL FIELD

This document relates to compositions and methods of stimulus responsive dynamic liquid crystal elastomers.

BACKGROUND

Liquid crystals are semi-ordered molecules that display long range order in their liquid crystalline phases. Liquid crystals can be influenced by their surrounding environment, and the properties of liquid crystals can depend on their relative shape and orientation.

SUMMARY

This disclosure describes compositions and methods of use of stimulus-responsive dynamic liquid crystal elastomers. In some implementations, a composition contains an electrically conductive material. The electrically conductive material can be configured to respond to a first signal and enter a writeable state. The electrically conductive material can be configured to respond to an orthogonal signal to enter a stimulated state.

In some implementations, a composition is provided that includes an electrically conductive material. The electrically conductive material is configured to respond to a first signal to enter a writeable state, and to respond to an orthogonal signal to enter a stimulated state. In some implementations, the electrically conductive material includes a functionalized liquid crystal elastomer, a signal generating element, and a signal receiving element.

Some implementations provide a system that includes a functionalized liquid crystal elastomer, a signal generating element, and a signal receiving element. The functionalized liquid crystal elastomer is configured to crosslink in response to a first signal to generate a crosslinked functionalized liquid crystal elastomer. The crosslinked functionalized liquid crystal elastomer is configured to induce a strain in or actuate the signal generating element in response to an orthogonal signal, wherein inducing the strain in or actuating the signal generating element induces the signal generating element to generate a readout signal. The signal receiving element is configured to receive the signal.

In some implementations, a method is provided for monitoring an environment or a formation. The method includes placing a sensor in the environment or formation. The sensor can include a functionalized liquid crystal elastomer. The sensor can include a signal generating element. The method can include providing a first signal to the sensor. In response to the first signal, the functionalized liquid crystal elastomer reacts in a crosslinking reaction to generate a crosslinked functionalized liquid crystal elastomer. The method can include exposing the sensor to an orthogonal signal. In response to the orthogonal signal, the crosslinked functionalized liquid crystal elastomer can induce a strain in or actuate the signal generating element. Inducing strain in or actuating the signal generating element induces the signal generating element to generate a readout signal.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Liquid crystals (LCs) are materials which display long-range order in their liquid crystalline phases which, depending on their constitutions and environmental conditions, may respond to various applied stimuli such as heat, shear field, electric field, magnetic field, and light (ultraviolet, visible, or near-infrared). These external stimuli can influence and instruct molecular ordering. In certain LCs, these responses have been observed macroscopically through changes in the polarization of light penetrating the materials, modified shear response, and macroscopic material shape change. Liquid crystalline elastomers (LCEs) are polymeric liquid crystals that can be made to retain their liquid crystalline order through cross-linking in the liquid crystalline and aligned state. Artificial material systems of LCEs can emulate motion and the force output of, for example, natural musculo-skeletal systems. LCEs can be programmed pixel-by-pixel with micron-scale resolution to change specifically in shape in response to a thermal stimulus. This class of dynamic materials represents new avenues of research due their muscle-like contractile forces observed during shape-change.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Provided in this disclosure, in part, are compositions of stimulus-responsive dynamic liquid crystal elastomers and method of using the same. An electrically conductive material can be used as a sensor, for example, by having a non-writeable, writeable, and stimulated state. A first signal is used to induce the non-writeable material into a writeable state. In the writeable state, the electrically conductive material has the capacity for actuation in response to an orthogonal signal. In response to the orthogonal signal, the electrically conductive material then undergoes a conformation or shape change. This is the stimulated state of the material. The conformational or shape change induces a strain or actuation that can be used to generate a signal. The electrically conductive material can include a response material. The response material can be configured to propagate a readout signal in response to the strain or actuation in the electrically conductive material. The response material can also actuate in response to the actuation of the electrically conductive material. The stimulated state can be reversible, and in the absence of the orthogonal signal the electrically conductive material may resume its original shape or conformation.

The writeable state is reversible. In the writeable state, a second signal can be used to revert the writeable material into a non-writeable state. Accordingly, the material is reversibly switchable to an "on" or writeable state and an "off" or non-writeable state.

The electrically conductive material can be a liquid crystal elastomer or mesogen that is functionalized so that the ends of the material display dynamic functionality, for example by being capable of reversible crosslinking. The dynamic mesogen can be switched into the writeable state by a first signal. The first signal can induce crosslinking of the mesogens, resulting in a crosslinked mesogen that is in the writeable state. Subsequent exposure to an orthogonal stimulus can result in a stimulated state and conformational or shape change in the crosslinked mesogen. The crosslinked mesogen can return to the non-writeable state by exposure to the second signal.

The first and second signal can be light. The primary and secondary stimuli can each have a unique wavelength. For example, the first signal can be light with a wavelength of 365 nm. The second signal can be a light with a wavelength of 254 nm.

The orthogonal stimulus can be an electric field, a magnetic field, light, heat, or a chemical, metabolite, or both. The orthogonal stimulus can be a change in an electric field, magnetic field, light, heat, or a change in the concentration of a chemical, metabolite, or both.

The response to orthogonal stimuli can be enhanced using sensitizers. For example, if electric field responsivity is sought, an electric field sensitizer may be added to or dispersed into the electrically conductive material. Electric field sensitizers can include, for example, carbon black, carbon nanotubes, carbon nanofiber, or carbon fiber. If the orthogonal stimulus is light, a chromophoric sensitizer can be added to or dispersed into the electrically conductive material. Chromophoric sensitizers include, for example, titania nanoparticles, n-doped titania nanoparticles, p-doped titania nanoparticles, porphyrins, expanded porphyrins, and conjugated polymers. Conjugated polymers can include, for example, polythiophene, polyaniline, polyphenylene vinylene and derivatives. Chromophoric sensitizers can include, for example, rhodamine dyes or fluorescein dyes.

In some implementations, the liquid crystal elastomer is lithographically patterned with light such that the elastomer is cross-linked at discrete sites in the material. These locations are then able selectively to undergo a shape-change response to an orthogonal stimulus relative to sites that were not radiated with light and thus left in the non-writeable state, without the cross-links.

In some implementations, the liquid crystal elastomer is lithographically patterned with an electric field such that the elastomer is intentionally cross-linked at discrete sites in the material. These locations are then able selectively to undergo a shape-change response to an orthogonal stimulus relative to sites that were not exposed to an electrical potential and thus left in the non-writeable state, without the cross-links.

Figure 1:
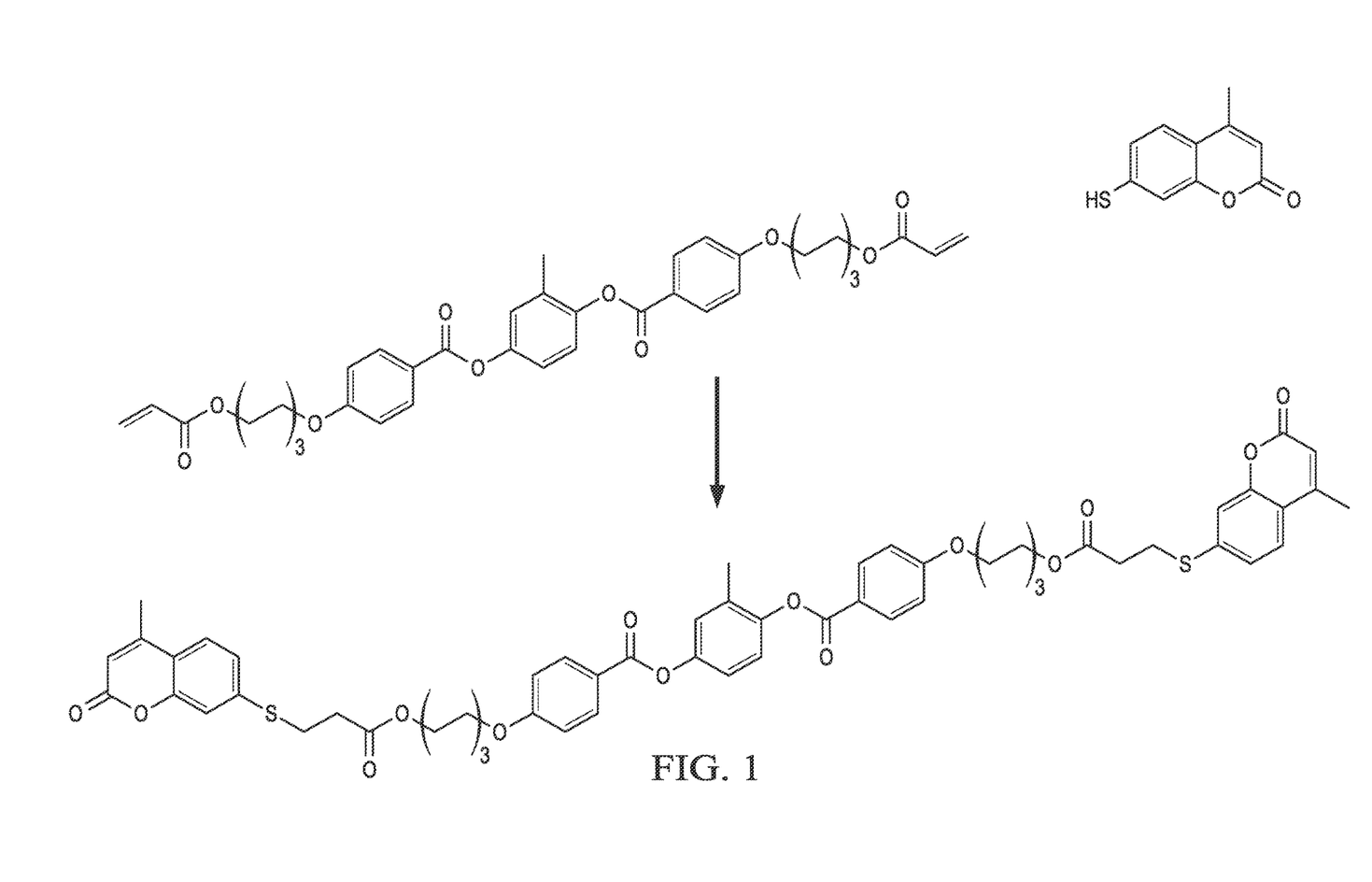
FIG. 1 is an example reaction of RM82 with methylcoumarin to yield methylcoumarin-functionalized RM82.
Figure 2A:
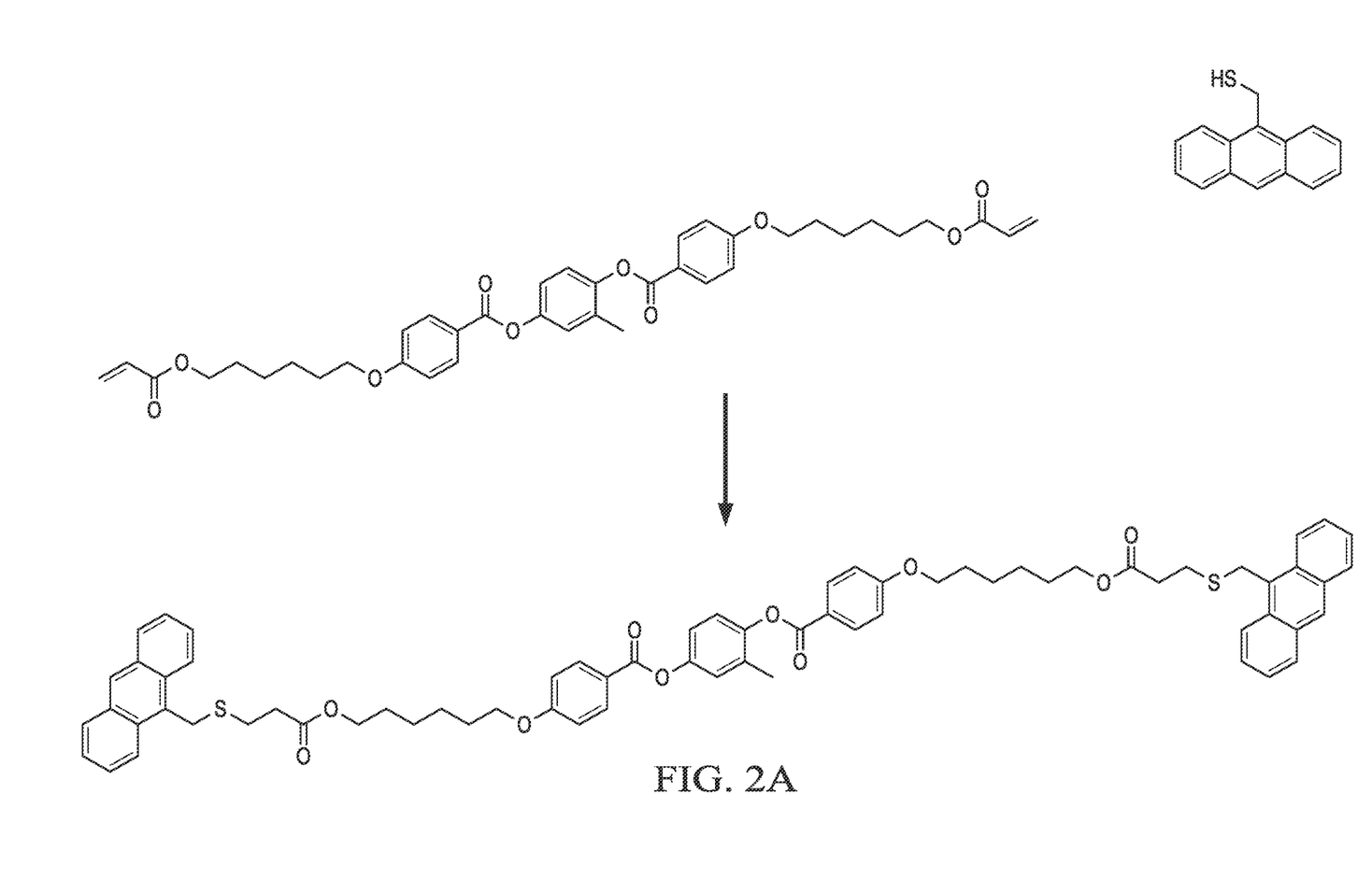
FIG. 2A is an example reaction of RM82 with methylthioanthracene to yield anthracene-functionalized RM82.

The electrically conductive material can be a functionalized polymer. For example 1,4-bis-[4-(6-acryloyloxyhexyloxy)benzoyloxy]-2-methylbenzene (RM82) can be functionalized with methylcoumarin to yield methylcoumarin-functionalized RM82, with anthracene to yield anthracene-functionalized RM82. FIG. 1 is an example reaction of RM82 with methylcoumarin to yield methylcoumarin-functionalized RM82. Functionalized RM82 can then be induced into a writeable state by the first signal, for example ultraviolet (UV) light with a first wavelength. In some implementations, exposure to 365 nm light results in dimerization of the methylcoumarin moiety, which crosslinks the functionalized RM82 into a polymeric network. The polymeric network is the writeable state for this example. FIG. 2A is an example reaction of RM82 with methylthioanthracene to yield anthracene-functionalized RM82. Anthracene-functionalized RM82 is also capable of cross-linking in response to a first signal, for example UV light with a first wavelength. In some implementations, anthracene-functionalized RM82 is crosslinked in response to 365 nm light.

Figure 2B:
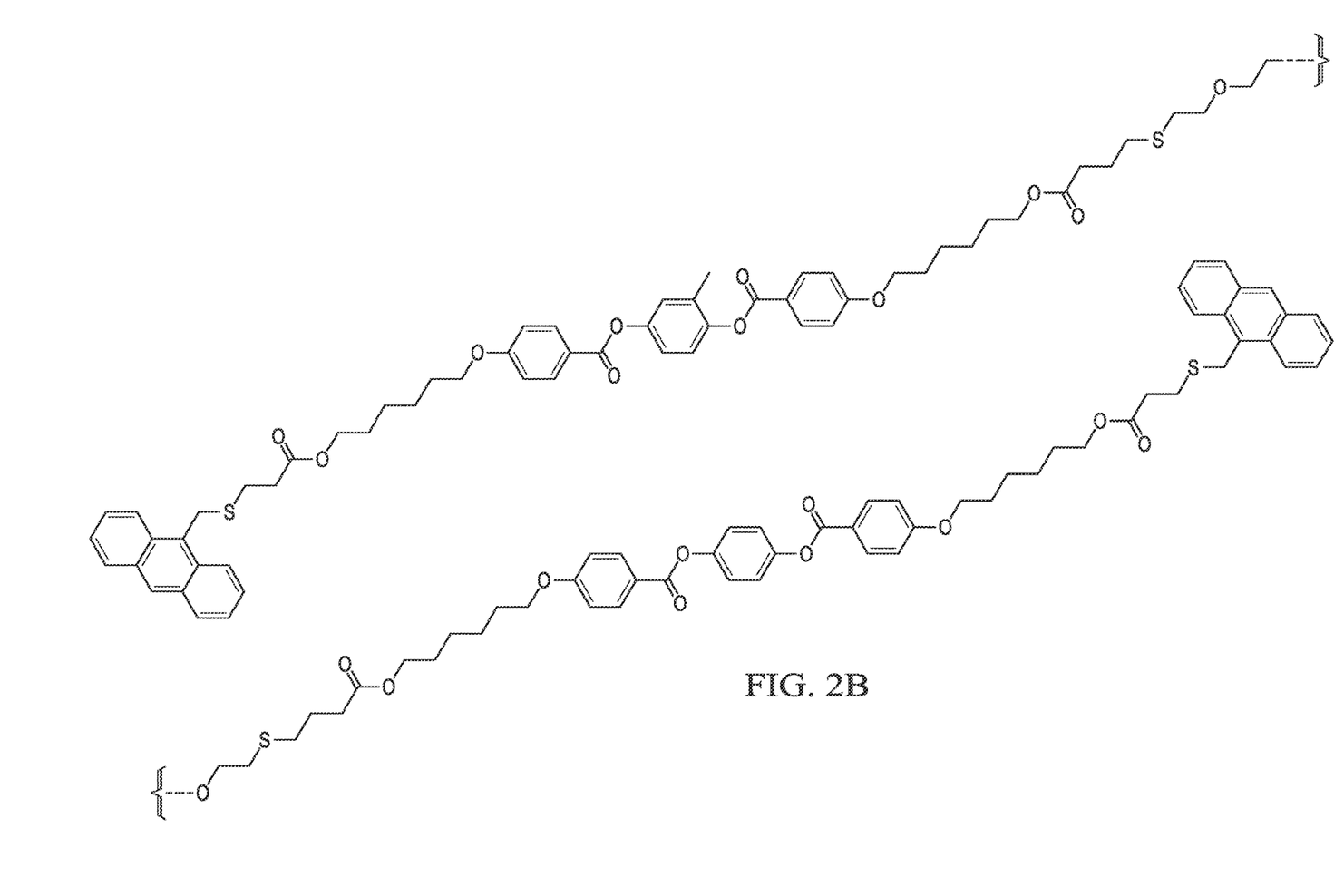
FIG. 2B is an example of functionalized RM82 that is the reaction product of the reaction between EDDET, RM82, and methylthioanthracene in a 1:2:2 molar ratio.

In some implementations, two RM82 moieties can be crosslinked initially with 2,2'-(ethylenedioxy)diethanol (EDDET) and capped with methylthioanthracene. FIG. 2B shows the reaction product of the reaction between EDDET, RM82, and methylthioanthracene in a 1:2:2 molar ratio. The inclusion of EDDET can result in a polymer with appropriate elasticity for use in the stimulus-responsive applications described in this application.

The functionalized RM82 can return to the non-writeable state by exposure to a second signal, for example exposure to UV light with a second wavelength. In some implementations, the functionalized RM82 can return to the non-writeable state in response to a light with a wavelength of 254 nm. Exposure to this light causes the functionalization reaction to reverse, and the material enters a non-writeable state. In some implementations, the second signal can be heat. For example, when RM82 is functionalized with anthracene, the reversion of the crosslinking reaction can be achieved with heat (above 100° C.).

In the polymeric/writeable state, exposure to an orthogonal signal results in an actuation or a strain. For example, exposure to heat can cause the polymeric network to shift from a nematic, semi-ordered phase to an isotropic or fluid-like phase. This shift results in an actuation or strain in the polymeric network.

The orthogonal stimulus can be an electric field, a magnetic field, light, heat, or a chemical, metabolite, or both. The orthogonal stimulus can be a change in an electric field, magnetic field, light, heat, or a change in the concentration of a chemical, metabolite, or both.

In one example, the electrically conductive materials with a writeable and non-writeable state can be used in antennas. The electrically conductive material in the antenna can be a functionalized polymer. The antenna can include sensitizers. These antennas can be used to sense changes in an environment, for example changes in an electric field, magnetic field, light, heat, or the concentration of a chemical, metabolite, or both. If the antennas are exposed to the first signal, the antenna is then "on" or in a writeable state. Subsequent exposure to an orthogonal stimulus can cause the antenna to change shape, for example unfold, fold, roll, or unroll. In some implementations, the change in shape changes the polarization handedness or chirality of the antenna. The shape change can then result in the antenna generating a signal. The signal can then be read by a receiver. The crosslinked functionalized liquid crystal elastomer can be configured to reverse the crosslinking reaction in response to a second signal and thus transition into a 'non-writeable' state.

The antenna can respond to an orthogonal signal. The orthogonal signal can be an electric field, a magnetic field, light, heat, or a chemical, metabolite, or both. The orthogonal signal can be a change in an electric field, magnetic field, light, heat, or a change in the concentration of a chemical, metabolite, or both. Exposure to an orthogonal signal can cause a shape change in the antenna.

The antenna can be configured to change in polarization or to change in resonance frequency in response to the strain or actuation. In some implementations, the change in shape changes the polarization handedness or chirality of the antenna. The shape change can then result in the antenna generating a signal. The signal can then be read by a receiver. The crosslinked functionalized liquid crystal elastomer can be configured to reverse the crosslinking reaction in response to a second signal and thus transition into a 'non-writeable' state. In some implementations, the antenna is produced with liquid crystal elastomers and includes conductive materials, nanomaterials, fibers, or nanofibers. For example, the antenna can include for example carbon black, carbon nanotubes, carbon nanofiber, or carbon fiber. The conductive materials, nanomaterials, fiber and nanofibers improve the electric field sensitivity of the antenna. The antenna can be programmed to respond to a first signal, a second signal, and an orthogonal signal. In some implementations, the antenna can be programmed by varying the composition of the liquid crystal elastomer.

The electrically conductive material with a writeable, non-writeable, and stimulated state can be used in a system as a means of generating a signal in response to an orthogonal signal. For example, a system can include a functionalized liquid crystal elastomer, a signal generating element, and a signal receiving element. The functionalized liquid crystal elastomer can be functionalized to crosslink in response to a first signal to generate a crosslinked functionalized liquid crystal elastomer. The crosslinked functionalized liquid crystal elastomer can be configured to induce a strain in or actuate the signal generating element in response to an orthogonal signal. Inducing a strain or actuating the signal generating element can induce the signal generating element to generate a readout signal. For example, the signal generating element can be an antenna. The antenna can be configured to change in polarization or to change in resonance frequency in response to the strain or actuation. The crosslinked functionalized liquid crystal elastomer can be configured to reverse the crosslinking reaction in response to a second signal. In some implementations, the first signal is a first light with a first wavelength. In some implementations, the second signal is a second light with a second wavelength.

The system can generate a readout signal in response to an orthogonal signal. The orthogonal signal can be an environmental signal. The environmental signal can be an electric field, a magnetic field, a third light with a third wavelength or the presence of a chemical, metabolite, or both. The environmental signal can be a change in an electric field, magnetic field, a third light with a third wavelength or a change in the concentration of a chemical, metabolite, or both.

The system can also include a sensitizer. In this instance, a sensitizer is an additive which increases the sensitivity of the material to a certain stimulus. In some implementations, the sensitizer can be an electric field sensitizer, for example carbon black, carbon nanotubes, carbon nanofiber, or carbon fiber. The sensitizer can be a chromophoric sensitizer, for example titania nanoparticles, n-doped titania nanoparticles, p-doped titania nanoparticles, porphyrins, expanded porphyrins, conjugated porphyrins, polythiophene, polyaniline, polyphenylene, vinylene, rhodamine dye or fluorescein dye.

The functionalized electrically conductive material in the system can be functionalized RM82. As described herein, the RM82 can be functionalized with, for example, methylcoumarin or anthracene.

Figure 3:
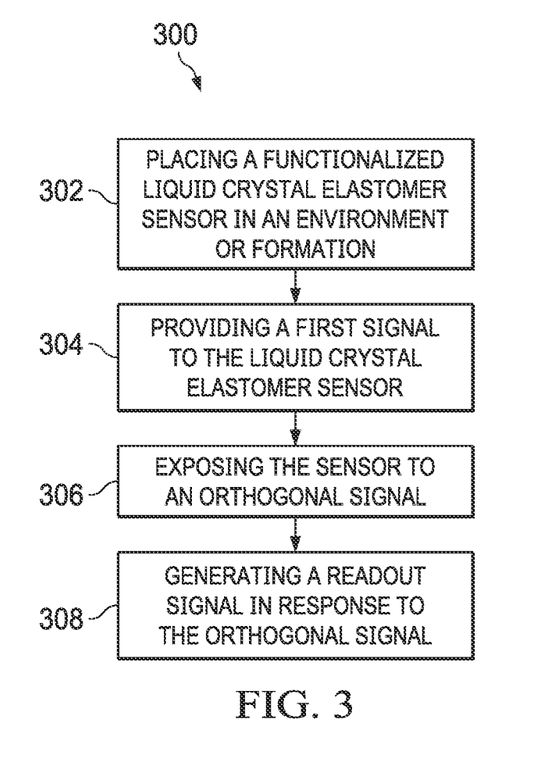
FIG. 3 is an example of a method 300 for monitoring an environment or formation using a functionalized liquid crystal elastomer sensor.

The system can be used to monitor an environment, for example a wellbore or a subterranean formation. For example, FIG. 3 is an example of a method 300 for monitoring an environment or formation using a functionalized liquid crystal elastomer sensor. The method 300 can include placing a functionalized liquid crystal elastomer sensor in the environment or formation. At 302, the functionalized liquid crystal elastomer sensor is placed in an environment or formation. The functionalized liquid crystal elastomer sensor can include a functionalized liquid crystal elastomer, and a signal generating element. At 304 a first signal is provided to the functionalized liquid crystal sensor. The first signal can be a first light with a first wavelength. The functionalized liquid crystal elastomer can be configured to respond to the first signal by reacting in a crosslinking reaction to generate a crosslinked functionalized liquid crystal elastomer. The functionalized liquid crystal elastomer can be functionalized RM82. In some implementations, the first signal is provided to the functionalized liquid crystal sensor before placing the sensor in an environment or formation. In some implementations, the first signal is provided to the functionalized liquid crystal sensor after placing the sensor in an environment or formation.

At 306 the sensor is exposed to an orthogonal signal. The orthogonal signal can be an environmental signal. For example, the environmental signal can be an electric field, a magnetic field, a third light with a third wavelength, heat, or the presence of a chemical, metabolite, or both. The environmental signal can be a change in an electric field, a change in a magnetic field, a change in a third light with a third wavelength, a change in heat, or a change in the concentration of a chemical, metabolite, or both. The crosslinking functionalized liquid crystal elastomer can be configured to react in response to the orthogonal signal to induce a strain in or actuate the signal generating element. The signal generating element can be configured to generate a readout signal at 308 in response to the strain or actuation. The method can include receiving the readout signal with a signal receiving element.

In some implementations, generating the readout signal includes generating the readout signal with an antenna. For example, the strain or actuation in the signal generating element can induce an antenna to change in polarization or to change in resonance frequency.

The method can include providing a second signal to the sensor. The crosslinked functionalized liquid crystal sensor can be configured to reverse the crosslinking reaction in response to the second signal. The second signal can be a second light with a second wavelength.

The method can include placing a liquid crystal sensor that includes a sensitizer. The sensitizer can be an electric field sensitizer, for example carbon black, carbon nanotubes, carbon nanofiber, or carbon fiber. The sensitizer can be a chromophoric sensitizer, for example titania nanoparticles, n-doped titania nanoparticles, p-doped titania nanoparticles, porphyrins, expanded porphyrins, conjugated polymers, polythiophene, polyaniline, polyphenylene vinylene, rhodamine dye, or fluorescein dye.

The electrically conductive materials with a writeable, non-writeable, and stimulated state can be used in resistors, capacitors, inductors, interconnects, and field-effect transistors. Interconnects are physical or logical connections between two electronic devices in a computer or microcontroller. The electrically conductive materials described can be used in a semiconductor to dynamically adjust doping content through the reversibly controlled expansion or contraction of the material used as the semiconductor.

These liquid crystal elastomer (LCE) materials can also be used as sensors that are tunable by the dynamic surface area of the dynamically addressable actuating material. LCEs can expand and contract in response to a temperature transition. These expansions and contractions may correspond to variations in surface area.

The electrically conductive material, system, or method can be used in drilling and in subterranean formations. For example, the electrically conductive material can be used in well completion operations where reversibly expandable materials are needed. If the electrically conductive material is responsive to heat as an orthogonal signal, the actuation of the material may be tuned to the dynamic thermal environment of the downhole wellbore. Accordingly, drilling equipment, for example a wellbore casing, can respond to the dynamic thermal expansion and contraction that occurs during production cycling.

The electrically conductive material can be used for other purposes. For example, the material can be used in a self-propelling polymer or polymer composite material, where the propulsion of the material is achieved through the actuation of the material.

EXAMPLES

Dichloromethane, sodium sulfate, mercaptomethylcoumarin, hydrochloric acid, and diazabicyloundec-7-ene (DBU) were obtained from Sigma-Aldrich.

The syntheses are presented in the following examples:

Example 1: Preparation of Mercaptomethylcoumarin Functionalized RM82

10.0 g of RM82 and 3.4 g of mercaptomethylcoumarin (Sigma-Aldrich) were added to a round bottom flask and dissolved in 100 mL of dichloromethane (Sigma-Aldrich). 1.8 g diazabicyloundec-7-ene (DBU) (Sigma-Aldrich) was added with stirring, and the mixture was allowed to stir at room temperature overnight. The product was washed with 1M HCl, 0.1 M HCl, and deionized water, then dried over sodium sulfate (Sigma-Aldrich). The solvent was removed with a rotovap to yield the desired product.

Example 2: Preparation of Anthracene Functionalized RM82

EDDET, RM82, and methylthioanthracene were reacted in a 1:2:2 molar ratio. To a clean round bottom flask, 0.68 g of EDDET, 1.67 g of methylthioanthracene and 2.26 g of triethylamine were dissolved in 30 mL of chloroform with a stir bar. In a separate clean container, 5.0 g of RM82 were dissolved in 20 mL of chloroform. The RM82 solution was poured into the round bottom flask with rapid stirring and covered with aluminium foil. The reaction was allowed to proceed overnight.

After stirring overnight, the mixture was pumped down via rotovap to remove chloroform. The mixture was redissolved in fresh chloroform and washed with 1M HCl twice, then saturated NaCl brine twice, then deionized water once. Sodium sulfate anhydrous was used to remove remaining excess water and the organic phase was collected via a clean Buchner flask and vacuum filtration. The organic phase was then removed under vacuum for 2 hours.

Example 3: Preparation of Electrical Field Sensitized LCEs 10 grams of the LCE produced from Example 1 or Example 2 was blended under high shear (>500 s$^{-1}$) with 0.05 grams of multiwall carbon nanotubes to render an electrical field sensitized LCE.

Example 4: Procedure for UV-Crosslinking of Anthracene and Coumarin Functionalized LCEs 5 grams of the LCE produced in Examples 1, 2, or 3 was placed inside of a syringe with a 1.0 mm orifice and extruded. Upon extrusion a 365 nm wavelength light radiates the extruding product to cross link the material.

Example 5: Procedure for UV-Crosslinking of Anthracene and Coumarin Functionalized LCEs 0.1 grams of the material produced in Examples 1, 2, or 3 is sheared between two quartz plates (dimensions—2 mm×1 cm×4 cm) 365 nm light is applied through the glass to cross-link the shear-aligned LCE.

Example 6: Procedure for Thermal Actuation

A linear piece of the LCE produced in Examples 4 or 5 is heated through a thermal transition of 20° C. to result in a shape-change and actuation response quantified as strain.

The following units of measure have been mentioned in this disclosure:

| Unit of Measure | Full form |
|---|---|
| ° C. | degree Celsius |
| g | gram |
| S | Siemens |
| m | meter |
| cm | centimeter |
| M | molar (moles/liter) |

In some implementations, a composition contains an electrically conductive material. The electrically conductive material can be configured to respond to a first signal and enter a writeable state. The electrically conductive material can be configured to respond to an orthogonal signal to enter a stimulated state.

This aspect, taken alone or combinable with any other aspect, can include the following features. The electrically conductive material can be a functionalized liquid crystal elastomer. The functionalized liquid crystal elastomer can be configured to generate a crosslink between the functionalized liquid crystal elastomers in response to the first signal to generate a crosslinked functionalized liquid crystal elastomer.

This aspect, taken alone or combinable with any other aspect, can include the following features. The first signal can be a lithographically patterned light applied to the functionalized liquid crystal elastomer to generate crosslinks between the liquid crystal elastomers at discrete sites in the electrically conductive material.

This aspect, taken alone or combinable with any other aspect, can include the following features. The first signal can be a lithographically patterned electric field applied to the functionalized liquid crystal elastomer to generate crosslinks between the liquid crystal elastomers at discrete sites in the electrically conductive material.

This aspect, taken alone or combinable with any other aspect, can include the following features. The crosslinked functionalized liquid crystal elastomer can be configured to respond to the orthogonal signal by changing confirmation or shape.

This aspect, taken alone or combinable with any other aspect, can include the following features. Changing conformation or shape of the crosslinked functionalized liquid crystal elastomer can induce a strain in or actuate the crosslinked functionalized liquid crystal elastomer.

This aspect, taken alone or combinable with any other aspect, can include the following features. The composition can include a response material. The response material can be configured to propagate a readout signal in response to strain or actuation.

This aspect, taken alone or combinable with any other aspect, can include the following features. The response material can be an antenna.

This aspect, taken alone or combinable with any other aspect, can include the following features. The antenna can be configured to change in polarization or resonance frequency in response to strain or actuation of the functionalized liquid crystal elastomer.

This aspect, taken alone or combinable with any other aspect, can include the following features. The crosslinked functionalized liquid crystal elastomer can be configured to break the crosslink in response to a second signal to generate the functionalized liquid crystal elastomer.

This aspect, taken alone or combinable with any other aspect, can include the following features. The first signal can be a first light with a first wavelength.

This aspect, taken alone or combinable with any other aspect, can include the following features. The second signal can be a second light with a second wavelength.

This aspect, taken alone or combinable with any other aspect, can include the following features. The second signal can be heat.

This aspect, taken alone or combinable with any other aspect, can include the following features. The orthogonal signal can be a first environmental signal.

This aspect, taken alone or combinable with any other aspect, can include the following features. The first environmental signal can be an electric field, a magnetic field, or a third light with a third wavelength.

This aspect, taken alone or combinable with any other aspect, can include the following features. The first environmental signal can be a change in an electric field, a change in a magnetic field, a change in a light, a change in heat, or a change in concentration of a chemical, metabolite, or both.

This aspect, taken alone or combinable with any other aspect, can include the following features. The composition can include a sensitizer.

This aspect, taken alone or combinable with any other aspect, can include the following features. The sensitizer can be an electric field sensitizer.

This aspect, taken alone or combinable with any other aspect, can include the following features. The electric field sensitizer can be at least one of carbon black, carbon nanotubes, carbon nanofiber, or carbon fiber.

This aspect, taken alone or combinable with any other aspect, can include the following features. The sensitizer can be a chromophoric sensitizer.

This aspect, taken alone or combinable with any other aspect, can include the following features. The chromophoric sensitizer can be at least one of titania nanoparticles, n-doped titania nanoparticles, p-doped titania nanoparticles, porphyrins, expanded porphyrins, conjugated polymers, polythiophene, polyaniline, polyphenylene vinylene, rhodamine dye or fluorescein dye.

This aspect, taken alone or combinable with any other aspect, can include the following features. The electrically conductive material can be functionalized RM82.

This aspect, taken alone or combinable with any other aspect, can include the following features. The functionalized RM82 can be functionalized with methylcoumarin.

This aspect, taken alone or combinable with any other aspect, can include the following features. The functionalized RM82 can be functionalized with anthracene.

In some implementations, a system includes a functionalized liquid crystal elastomer, a signal generating element, and a signal receiving element. The functionalized liquid crystal elastomer can be functionalized to generate a crosslink between functionalized liquid crystal elastomers in response to a first signal. This generates a crosslinked functionalized liquid crystal elastomer. The crosslinked functionalized liquid crystal elastomer can be configured to induce a strain in or actuate the signal generating element in response to an orthogonal signal. Inducing strain or actuating the signal generating element induces the signal generating element to generate a readout signal. The signal receiving element can be configured to receive the signal.

This aspect, taken alone or combinable with any other aspect, can include the following features. The signal generating element can be an antenna.

This aspect, taken alone or combinable with any other aspect, can include the following features. The antenna can be configured to change in polarization or in resonance frequency in response to strain or actuation.

This aspect, taken alone or combinable with any other aspect, can include the following features. The crosslinked functionalized liquid crystal elastomer is configured to break the crosslink in response to a second signal.

This aspect, taken alone or combinable with any other aspect, can include the following features. The first signal can be a first light with a first wavelength.

This aspect, taken alone or combinable with any other aspect, can include the following features. The first signal can be a lithographically patterned light applied to the functionalized liquid crystal elastomer to generate crosslinks between the liquid crystal elastomers at discrete sites.

This aspect, taken alone or combinable with any other aspect, can include the following features. The first signal can be a lithographically patterned electric field applied to the functionalized liquid crystal elastomer to generate crosslinks between the liquid crystal elastomers at discrete sites.

This aspect, taken alone or combinable with any other aspect, can include the following features. The second signal can be a second light with a second wavelength.

This aspect, taken alone or combinable with any other aspect, can include the following features. The second signal can be heat.

This aspect, taken alone or combinable with any other aspect, can include the following features. The orthogonal signal can be a first environmental signal.

This aspect, taken alone or combinable with any other aspect, can include the following features. The first environmental signal can be an electric field, a magnetic field, a third light with a third wavelength, or a chemical, a metabolite, or both.

This aspect, taken alone or combinable with any other aspect, can include the following features. The first environmental signal can be a change in an electric field, a change in a magnetic field, a change in a light, a change in heat, or a change in concentration of a chemical, metabolite, or both.

This aspect, taken alone or combinable with any other aspect, can include the following features. The system can include a sensitizer.

This aspect, taken alone or combinable with any other aspect, can include the following features. The sensitizer can be an electric field sensitizer.

This aspect, taken alone or combinable with any other aspect, can include the following features. The electric field sensitizer can be at least one of carbon black, carbon nanotubes, carbon nanofiber, or carbon fiber.

This aspect, taken alone or combinable with any other aspect, can include the following features. The sensitizer can be a chromophoric sensitizer.

This aspect, taken alone or combinable with any other aspect, can include the following features. The chromophoric sensitizer can be at least one of titania nanoparticles, n-doped titania nanoparticles, p-doped titania nanoparticles, porphyrins, expanded porphyrins, conjugated porphyrins, polythiophene, polyaniline, polyphenylene vinylene, rhodamine dye or fluorescein dye.

This aspect, taken alone or combinable with any other aspect, can include the following features. The functionalized liquid crystal elastomer can be functionalized RM82.

This aspect, taken alone or combinable with any other aspect, can include the following features. The functionalized RM82 can be functionalized with methylcoumarin.

This aspect, taken alone or combinable with any other aspect, can include the following features. The functionalized RM82 can be functionalized with anthracene.

In some implementations, a method for monitoring an environment or a formation includes placing a sensor in the environment or formation. The sensor can include a functionalized liquid crystal elastomer. The sensor can include a signal generating element. The method can include providing a first signal to the sensor. In response to the first signal, the functionalized liquid crystal elastomer reacts in a crosslinking reaction to generate a crosslinked functionalized liquid crystal elastomer. The method can include exposing the sensor to an orthogonal signal. In response to the orthogonal signal, the crosslinked functionalized liquid crystal elastomer can induce a strain in or actuate the signal generating element. Inducing strain in or actuating the signal generating element induces the signal generating element to generate a readout signal.

This aspect, taken alone or combinable with any other aspect, can include the following features. The first signal can be a lithographically patterned light applied to the functionalized liquid crystal elastomer to generate crosslinks between the liquid crystal elastomers at discrete sites.

This aspect, taken alone or combinable with any other aspect, can include the following features. The first signal can be a lithographically patterned electric field applied to the functionalized liquid crystal elastomer to generate crosslinks between the liquid crystal elastomers at discrete sites.

This aspect, taken alone or combinable with any other aspect, can include the following features. The method can include receiving the signal with a signal receiving element.

This aspect, taken alone or combinable with any other aspect, can include the following features. The method can include generating the readout signal with an antenna.

This aspect, taken alone or combinable with any other aspect, can include the following features. The method can include generating the signal by a change in polarization or resonance frequency of the antenna.

This aspect, taken alone or combinable with any other aspect, can include the following features. The method can include providing a second signal to the sensor. In response to the second signal the crosslinking reaction can be reversed.

This aspect, taken alone or combinable with any other aspect, can include the following features. The method can include providing the first signal, wherein the first signal is a first light with a first wavelength.

This aspect, taken alone or combinable with any other aspect, can include the following features. The first signal can be a first light with a first wavelength.

This aspect, taken alone or combinable with any other aspect, can include the following features. The second signal can be a second light with a second wavelength.

This aspect, taken alone or combinable with any other aspect, can include the following features. The second signal can be heat.

This aspect, taken alone or combinable with any other aspect, can include the following features. The orthogonal signal can be an environmental signal.

This aspect, taken alone or combinable with any other aspect, can include the following features. The environmental signal can be an electric field, a magnetic field, a third light with a third wavelength, heat, or a chemical, metabolite, or both.

This aspect, taken alone or combinable with any other aspect, can include the following features. The environmental signal can be a change in an electric field, a change in a magnetic field, a change in a third light with a third wavelength, a change in heat or a change in concentration of a chemical, metabolite, or both.

This aspect, taken alone or combinable with any other aspect, can include the following features. The sensor can include a sensitizer.

This aspect, taken alone or combinable with any other aspect, can include the following features. The sensitizer can be an electric field sensitizer.

This aspect, taken alone or combinable with any other aspect, can include the following features. The electric field sensitizer can be at least one of carbon black, carbon nanotubes, carbon nanofiber, or carbon fiber.

This aspect, taken alone or combinable with any other aspect, can include the following features. The sensitizer can be a chromophoric sensitizer.

This aspect, taken alone or combinable with any other aspect, can include the following features. The chromophoric sensitizer can be at least one of titania nanoparticles, n-doped titania nanoparticles, p-doped titania nanoparticles, porphyrins, expanded porphyrins, conjugated polymers, polythiophene, polyaniline, polyphenylene vinylene, rhodamine dye or fluorescein dye.

This aspect, taken alone or combinable with any other aspect, can include the following features. The functionalized liquid crystal elastomer can be functionalized RM82.

This aspect, taken alone or combinable with any other aspect, can include the following features. The functionalized RM82 can be functionalized with methylcoumarin.

This aspect, taken alone or combinable with any other aspect, can include the following features. The functionalized RM82 can be functionalized with anthracene.

The term "about" as used in this disclosure can allow for a degree of variability in a value or range, for example, within 10%, within 5%, or within 1% of a stated value or of a stated limit of a range.

The term "electrically conductive material" as used in this disclosure refers to a material that allows the flow of electric current, for example a material a material with a conductivity ($\sigma$) equal to or greater than 10 S/m.

The term "elastomer" as used in this disclosure refers to a polymer with elasticity and viscosity.

The term "sensitizer" as used in this disclosure refers to a material that enhances the sensitivity or responsiveness, or extends the range of sensitivity, of an electrically conductive material or a crosslinked elastomer to an orthogonal signal.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15 degrees Celsius (° C.) to about 28° C.

The term "downhole" as used in this disclosure refers to under the surface of the earth, such as a location within or fluidly connected to a wellbore.

As used in this disclosure, the term "subterranean material" or "subterranean zone" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials.

As used in this disclosure, "weight percent" (wt. %) can be considered a mass fraction or a mass ratio of a substance to the total mixture or composition. Weight percent can be a weight-to-weight ratio or mass-to-mass ratio, unless indicated otherwise.

A number of implementations of the disclosure have been described. Nevertheless, it will be understood that various modifications may be made without departing from the spirit and scope of the disclosure.

What is claimed is:

1. A composition comprising functionalized liquid crystal elastomers comprising a signal receiving element, and a signal generating element, wherein the signal receiving element responds to a first signal to change the functionalized liquid crystal elastomers to a writeable state, and in the writable state, the signal generating element responds to an orthogonal signal to undergo a confirmation change, wherein the confirmation change induces a strain in the functionalized liquid crystal elastomers.

2. The composition of claim 1, wherein the writable state comprises crosslinks generated at discrete sites between the functionalized liquid crystal elastomers generating a crosslinked functionalized liquid crystal elastomer.

3. The composition of claim 2, wherein the first signal comprises a lithographically patterned light applied to the functionalized liquid crystal elastomers.

4. The composition of claim 2, wherein the first signal comprises a lithographically patterned electric field.

5. The composition of claim 2, wherein the crosslinked functionalized liquid crystal elastomer responds to the orthogonal signal by changing conformation.

6. The composition of claim 5, wherein changing conformation induces a strain in the crosslinked functionalized liquid crystal elastomer.

7. The composition of claim 6, further comprising a response material, wherein the response material is propagates a readout signal in response to the strain.

8. The composition of claim 7, wherein the response material is an antenna.

9. The composition of claim 8, wherein the antenna change in polarization or resonance frequency in response to the strain of the functionalized liquid crystal elastomer.

10. The composition of claim 2, wherein the crosslinked functionalized liquid crystal elastomer is configured to break the crosslink in response to a second signal to generate the functionalized liquid crystal elastomers.

11. The composition of claim 1, wherein the first signal comprises a first light at a first wavelength.

12. The composition of claim 10, wherein the second signal comprises a second light with a second wavelength.

13. The composition of claim 10, wherein the second signal comprises heat.

14. The composition of claim 1, wherein the orthogonal signal comprises an environmental signal.

15. The composition of claim 14, wherein the environmental signal comprises an electric field, a magnetic field, or a third light with a third wavelength, or any combinations thereof.

16. The composition of claim 14, wherein the environmental signal comprises a change in an electric field, a change in a magnetic field, a change in a light, a change in heat, a change in concentration of a chemical, or a change in concentration of a metabolite, or any combinations thereof.

17. The composition of claim 1, wherein the functionalized liquid crystal elastomers comprise a functionalized 1,4-bis-[4-(6-acryloyloxyhexyloxy)benzoyloxy]-2-methylbenzene (RM82).

18. The composition of claim 17, wherein the functionalized RM82 is functionalized with methylcoumarin.

19. The composition of claim 17, wherein the functionalized RM82 is functionalized with anthracene.

* * * * *